Jan. 10, 1928.
C. E. LUM
1,655,871
FRUIT TREATING MACHINE
Filed Oct. 25, 1926   2 Sheets-Sheet 1
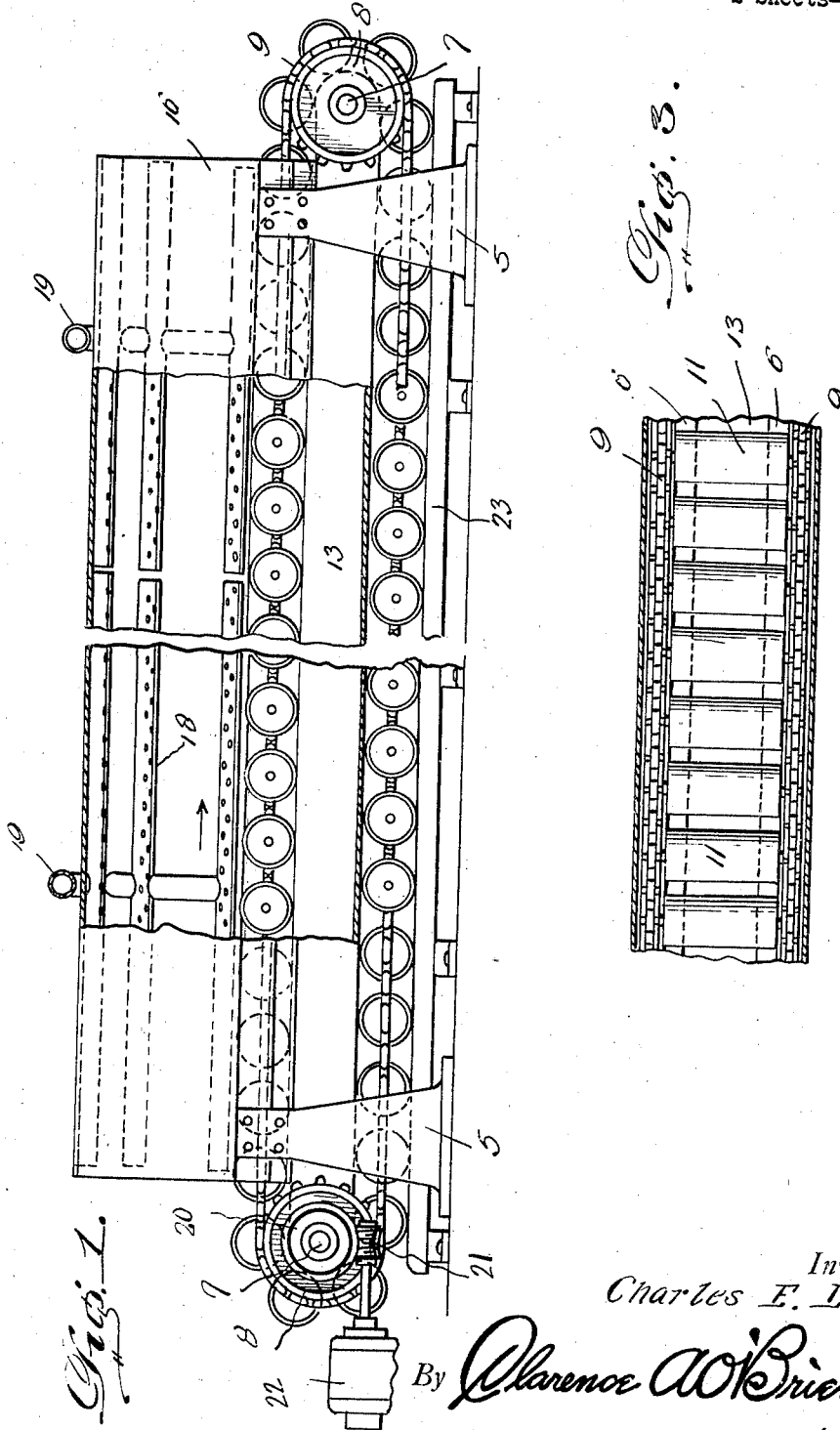
Inventor
Charles E. Lum
By Clarence A. O'Brien
Attorney Jan. 10, 1928.
C. E. LUM
FRUIT TREATING MACHINE
Filed Oct. 25, 1926  2 Sheets-Sheet 2
1,655,871
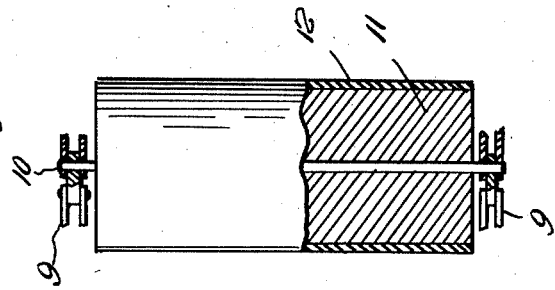
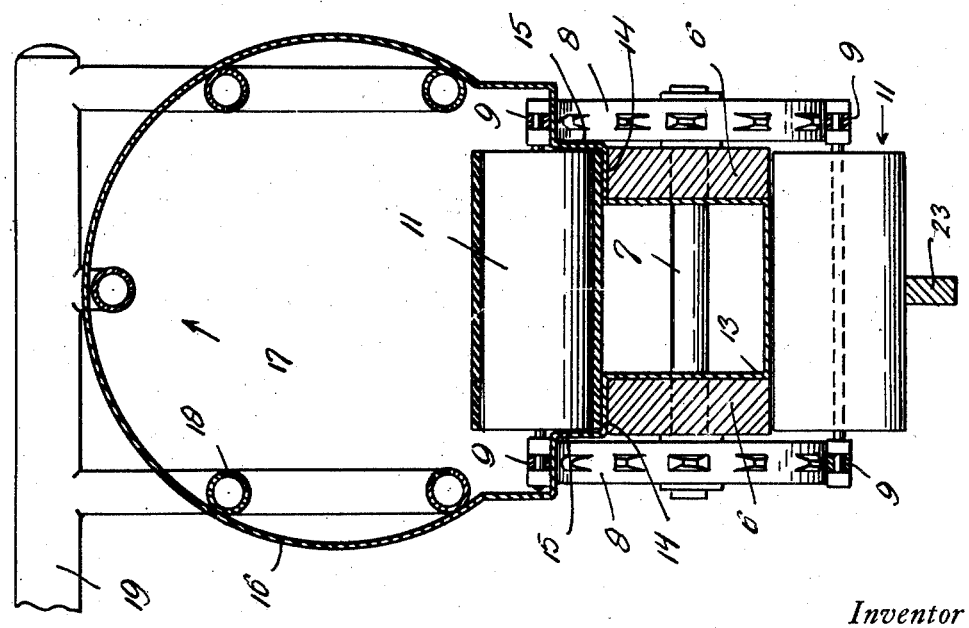
Inventor
Charles E. Lum
By Clarence A. O'Brien
Attorney Patented Jan. 10, 1928.

1,655,871

UNITED STATES PATENT OFFICE.

CHARLES E. LUM, OF YAKIMA, WASHINGTON.

FRUIT-TREATING MACHINE.

Application filed October 25, 1926. Serial No. 144,113.

This invention relates to new and useful improvements in fruit treating machines, and has more particular reference to a machine that is particularly adapted for use in the washing, drying, or chemically treating apples and pears.

One of the main objects of the invention resides in the provision of means whereby the fruit is moved longitudinally within air, water, or chemical, or other material emitting pipes, and wherein rotary and lateral motion is given the fruit so that the same will be thoroughly treated during the washing, drying, or chemically treating operation.

A further and important object of the invention resides in the provision of a machine of this character that entirely dispenses with any brush mechanism that invariably results in the bruising or other damaging of the fruit. In overcoming this great objection, my machine consists of one or more series of piping that have communication with water, cold or hot air, a chemical solution, etc., etc., under great pressure whereby the fruit may be thoroughly washed, chemically treated, thoroughly dried, or otherwise acted upon.

The machine is further so constructed that a plurality of the machines may be mounted or arranged in end to end relation so that if desired, the fruit may undergo a prolonged washing operation and then a drying operation while, if desired, the fruit may be passed before the drying operation through a treating operation.

The final salient object of the invention is to provide a machine of this character that is durable and efficient and is the assembling of scientific principles in a comprehensive and simple manner without unnecessary and complicated contrivances for its operation.

Other objects will become apparent as the nature of the invention is better understood, the same comprising the novel form, combination, and arrangement of parts hereinafter more fully described, shown in the accompanying drawings and claimed.

In the accompanying drawings wherein like reference characters indicate corresponding parts throughout the several views:

Figure 1 is a view partly in side elevation and partly in cross section of a fruit treating machine constructed in accordance with the present invention.

Figure 2 is an enlarged detail vertical section thereof.

Figure 3 is a reduced fragmentary plan of the fruit conveying, turning, and lateral motion imparting mechanism, and Figure 4 is an enlarged view partly in elevation and partly in cross section of one of the rolls of the conveyor for more clearly disclosing the attachment of the opposite ends of its carrying shaft to conveyor chains at opposite ends of the rolls.

Now having particular reference to the drawings, my novel fruit cleaning machine consists of pairs of spaced end standards 5—5 between longitudinally aligned ones of which are spaced side boards 6—6, the ends of these boards extending slightly beyond the standards as clearly disclosed in Figure 1. Mounted transversely between the side boards at opposite ends thereof are transverse shafts 7—7. The ends of the shafts project beyond the side boards and keyed thereon are relatively large sprocket wheels 8—8 over which are trained endless chains 9—9. Secured for rotation within predetermined transversely aligned links of the side chains 9—9 are roll carrying shafts 10 upon each of which is mounted a roll 11, the surface of which is provided with a rubber covering 12. As clearly disclosed in both Figures 1 and 3, these shafts 10 are so united with the side chains 9—9 that the surfaces of the rolls will be in slight spaced relation but not so great as to permit the fruit to fall or become wedged therebetween.

Arranged between the side boards 6—6 of the machine frame is a metallic trough 13, the upper edges of which extend laterally outwardly as at 14—14 for disposition upon the upper edges of said side boards, see Figure 2. The material forming the trough is then extended upwardly as at 15—15 in spaced relation with the opposite ends of the rolls 11 after which the material is extended outwardly beneath the upper flights of the endless chains 9—9 for supporting the same in horizontal manner.

The material is then formed to provide a cylindrical housing 16 that cooperates with the trough 13 and the intermediate portions of the material to completely enclose the upper flight of rolls of the conveyor. Arranged within the housing 16 is one or more series of piping 17, each series consisting of longitudinal pipes arranged in spaced relation around the interior of the housing and having communication with each other as clearly disclosed in Figures 1 and 2. The inner sides of the pipes of each series, are formed with small openings 18 throughout their length so that the water, solution, or air ejected therefrom will be properly directed upon the fruit that is conveyed through the housing 16 by reason of the conveyor mechanism.

Each series of piping has communication with a water, solution, or air storage under pressure by reason of a lateral pipe 19 upon the outer side of the housing.

One of the end shafts 7 is equipped outwardly of the adjacent sprocket gear with a worm gear 20 that has mesh with a worm 21 upon the inner end of the armature shaft of electric motor 22, which electric motor is in circuit with a source of electric supply, this means imparting movement to the conveyor mechanism. Of course, any other desirable operating means may be provided, that shown and described being merely by way of illustration.

Mounted directly beneath the center of the trough 13 in spaced relation therewith is a rail 23 upon which the lower flight of rolls will rest and be supported from sagging.

It will be obvious that when fruit is placed upon the conveyor and the same actuated, the fruit will be moved in the direction of the arrow in Figure 1 through the housing 16. Due to the irregular shape of apples and pears, and other deciduous fruits, the same will while being carried forward upon the conveyor rotate and move laterally so that the entire surface of the fruit will be subjected to the water, chemical solution, or air, all under pressure for thoroughly washing, treating, and drying the same. By reason of the rubber covering for the conveyor rolls the fruit will not become bruised, this covering also facilitating the cleaning and drying of the rolls.

In view of the foregoing description when considered in conjunction with the accompanying drawings, it will at once be apparent that I have provided a highly novel, simple, and efficient fruit cleaning machine that is well adapted for all the purposes heretofore designated, and even though I have herein shown and described the invention as consisting of certain detail structural elements it is nevertheless to be understood that some departures may be had therefrom without affecting the spirit and scope of the appended claims.

Having thus described the invention, what I claim as new is:—

1. In a fruit treating machine of the character described, a frame including spaced horizontally arranged side boards, a waste trough mounted between said side boards and supported at its opposite sides by said side boards, an open ended housing disposed above the side boards and extending in parallel relation therewith, an endless conveyor movable longitudinally around said side boards and consisting of side chains between which are attached spaced conveying rolls, the opposite ends of the rollers of the upper flights being supported upon the upper edges of the side boards, means integral with the waste trough and casing for supporting the upper flights of the conveyor chains, and air or liquid ejecting pipes arranged within the casing and in communication with a source of air or liquid supply.

2. In a fruit treating machine of the character described, a frame including spaced horizontally arranged side boards, a waste trough mounted between said side boards and supported at its opposite sides by said side boards, an open ended housing disposed above the side boards and extending in parallel relation therewith, an endless conveyor movable longitudinally around said side boards and consisting of side chains between which are attached spaced conveying rolls, the opposite ends of the rollers of the upper flights being supported upon the upper edges of the side boards, means integral with the waste trough and casing for supporting the upper flights of the conveyor chains, air or liquid ejecting pipes arranged within the casing and in communication with a source of air or liquid supply, and means disposed beneath the trough in spaced relation therewith for supporting the rolls of the lower flight of said conveyor.

3. In a fruit treating machine of the class described, a frame including spaced horizontally arranged side boards, a waste trough mounted between the side boards and supported at its opposite sides by said side boards, the upper portions of the sides of the trough being disposed outwardly over the upper edges of the side board and then upwardly, then outwardly to provide chain supported ledges, an open ended housing disposed above the side board and formed integral with the outer edges of the ledge portions of the trough, an endless conveyor movable longitudinally around the side boards and comprising a pair of side chains between which are secured at spaced intervals roll supporting shafts, rolls secured on the shafts and adapted to travel over the beforementioned laterally disposed portions of the side walls of the top which are disposed over the upper edges of the side boards, the chains being adapted to travel over the aforementioned ledges, fluid ejecting pipes arranged within the casing for treating the fruit placed on the conveyor, a supply pipe communicating with the fluid ejecting pipes, and means disposed beneath the trough in spaced relation thereto for supporting the rolls of the lower flight of said conveyor.

In testimony whereof I affix my signature.

CHARLES E. LUM.